US011112152B2

(12) United States Patent
Ullrich et al.

(10) Patent No.: US 11,112,152 B2
(45) Date of Patent: Sep. 7, 2021

(54) SYSTEM DESIGN FOR NOISE REDUCTION OF SOLENOID VALVE

(71) Applicant: Lennox Industries Inc., Richardson, TX (US)

(72) Inventors: Brandon Ullrich, Grand Prairie, TX (US); Ammar Kailani, Richardson, TX (US)

(73) Assignee: Lennox Industries Inc., Richardson, TX (US)

( * ) Notice: Subject to any disclaimer, the term of this patent is extended or adjusted under 35 U.S.C. 154(b) by 75 days.

(21) Appl. No.: 16/354,377

(22) Filed: Mar. 15, 2019

(65) Prior Publication Data

US 2019/0212041 A1 Jul. 11, 2019

Related U.S. Application Data

(63) Continuation of application No. 15/456,006, filed on Mar. 10, 2017, now Pat. No. 10,274,235.

(51) Int. Cl.
*F25B 41/20* (2021.01)
*F16L 55/027* (2006.01)
*F25B 49/02* (2006.01)

(52) U.S. Cl.
CPC ........ *F25B 41/20* (2021.01); *F16L 55/02718* (2013.01); *F25B 49/02* (2013.01); *F25B 2400/0401* (2013.01); *F25B 2400/0409* (2013.01); *F25B 2500/07* (2013.01); *F25B 2500/12* (2013.01); *F25B 2500/26* (2013.01); *F25B 2500/27* (2013.01); *F25B 2600/2501* (2013.01); *F25B 2700/191* (2013.01); *F25B 2700/195* (2013.01); *F25B 2700/197* (2013.01); *F25B 2700/1931* (2013.01);
(Continued)

(58) Field of Classification Search
CPC ............. F25B 41/04; F25B 2400/0409; F25B 2500/27; F25B 2700/191; F25B 2700/1931; F25B 2700/1933; F25B 2700/195; F25B 2700/197; F25B 2700/21151; F25B 2700/21152; F25B 2700/21163; F25B 2700/021175; F25B 49/02; F25B 2400/0401; F25B 2500/12; F25B 2500/26; F25B 2500/07; F25B 2600/2501; F16L 55/02718
See application file for complete search history.

(56) References Cited

U.S. PATENT DOCUMENTS 3,592,017 A 7/1971 Lipman et al.
4,788,828 A 12/1988 Sato
(Continued)

OTHER PUBLICATIONS

Harlan H. Bengtson, PhD, P.E., Orifice and Venturi Pipe Flow Meters for Liquid and Gas Flow (Year: 2010).*

*Primary Examiner* — Emmanuel E Duke
(74) *Attorney, Agent, or Firm* — Shackelford, Bowen, McKinley & Norton, LLP

(57) ABSTRACT

A bypass line is described that is capable of equalizing pressure within an HVAC system. The bypass line can also cause less noise than other solutions. A bypass line under the present disclosure can comprise a line from a high pressure side to a low pressure side of an HVAC system. Valves and orifices can be disposed within the bypass line. The valves and orifices help to slow the speed of fluid from high pressure to low pressure locations, thus reducing noise during pressure equalization.

20 Claims, 6 Drawing Sheets

(52) U.S. Cl.
CPC ........... *F25B 2700/1933* (2013.01); *F25B 2700/21151* (2013.01); *F25B 2700/21152* (2013.01); *F25B 2700/21163* (2013.01); *F25B 2700/21175* (2013.01)

(56) References Cited

U.S. PATENT DOCUMENTS

| | | | |
|---|---|---|---|
| 5,131,238 A * | 7/1992 | Meckler | F24F 3/00 62/271 |
| 5,862,676 A | 1/1999 | Kim et al. | |
| 2001/0027657 A1 | 10/2001 | Yamasaki | |
| 2002/0023448 A1 | 2/2002 | Ito et al. | |
| 2003/0113215 A1 * | 6/2003 | Choi | F04D 27/0292 417/279 |
| 2004/0118150 A1 | 6/2004 | Yamada et al. | |
| 2006/0144758 A1 * | 7/2006 | Swan, III | C10G 11/187 208/113 |
| 2006/0288713 A1 * | 12/2006 | Knight | F25B 49/027 62/176.6 |
| 2007/0095097 A1 | 5/2007 | Cowans et al. | |
| 2010/0199712 A1 * | 8/2010 | Lifson | F25B 41/20 62/498 |
| 2011/0048041 A1 * | 3/2011 | Asprovski | F25B 1/10 62/115 |
| 2012/0266621 A1 | 10/2012 | Yokohara et al. | |
| 2013/0019615 A1 | 1/2013 | Choi et al. | |
| 2014/0083126 A1 | 3/2014 | Shimazu et al. | |
| 2014/0109605 A1 * | 4/2014 | Qu | F25B 49/02 62/118 |
| 2017/0102175 A1 * | 4/2017 | Chen | F25B 49/027 |

\* cited by examiner

SYSTEM DESIGN FOR NOISE REDUCTION OF SOLENOID VALVE

CROSS-REFERENCE TO RELATED APPLICATION

This application is a continuation of U.S. patent application Ser. No. 15/456,006, filed on Mar. 10, 2017. U.S. patent application Ser. No. 15/456,006 is incorporated herein by reference.

TECHNICAL FIELD

The present disclosure is directed to HVAC systems and more particularly to high to low pressure bypass valves.

BACKGROUND OF THE INVENTION

Pressure equalization in an HVAC system can occur when a valve is opened that connects one region to another. The quick flow of fluid from one side of an HVAC circuit to another can produce noises. Similar noises can occur on system startup. Noises are particularly common in bypass valves that connect a high pressure side to a low pressure side.

BRIEF SUMMARY OF THE INVENTION

One possible embodiment of the present disclosure comprises a bypass line within an HVAC system comprising: a fluid line connected to a high pressure side of the HVAC system and a low pressure side of the HVAC system; a valve within the fluid line disposed between the high pressure side and the low pressure side; and an orifice disposed within the fluid line and comprising a smaller diameter than the diameter of the fluid line such that when the valve is open the orifice slows down the flow of refrigerant from the high pressure side to the low pressure side and thereby reduces the noise of pressure equalization in the HVAC system.

Another possible embodiment of the present disclosure comprises an HVAC system for circulating a refrigerant and conditioning a space and comprising a high pressure side and a low pressure side, comprising: a condenser configured to condense at least a portion of the refrigerant; an expansion device configured to receive the refrigerant from the condenser and lower the refrigerant pressure; an evaporator coil configured to receive the refrigerant from the expansion device and to evaporate at least a portion of the refrigerant; a compressor configured to receive the refrigerant from the evaporator coil, to direct the refrigerant to the condenser, and to increase the refrigerant pressure; and a bypass line connecting the high and low pressure sides, the bypass line comprising; a fluid line connected to the high pressure side and the low pressure side; a valve within the fluid line disposed between the high pressure side and the low pressure side; and an orifice disposed within the fluid line and comprising a smaller diameter than the diameter of the fluid line such that when the valve is open the orifice slows down the flow of refrigerant from the high pressure side to the low pressure side and thereby reduces the noise of pressure equalization in the HVAC system.

Another possible embodiment of the present disclosure comprises a method of equalizing pressure within an HVAC system comprising: connecting a bypass line from a high pressure side of the HVAC system to a lower pressure side of the HVAC system; receiving a request for pressure equalization in the HVAC system; opening a valve within the bypass line so that refrigerant flows from the high pressure side to the low pressure side; and providing an orifice within the bypass line, the orifice comprising a smaller diameter than the bypass line such that the flow of refrigerant is slowed thereby reducing the sound of pressure equalization.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
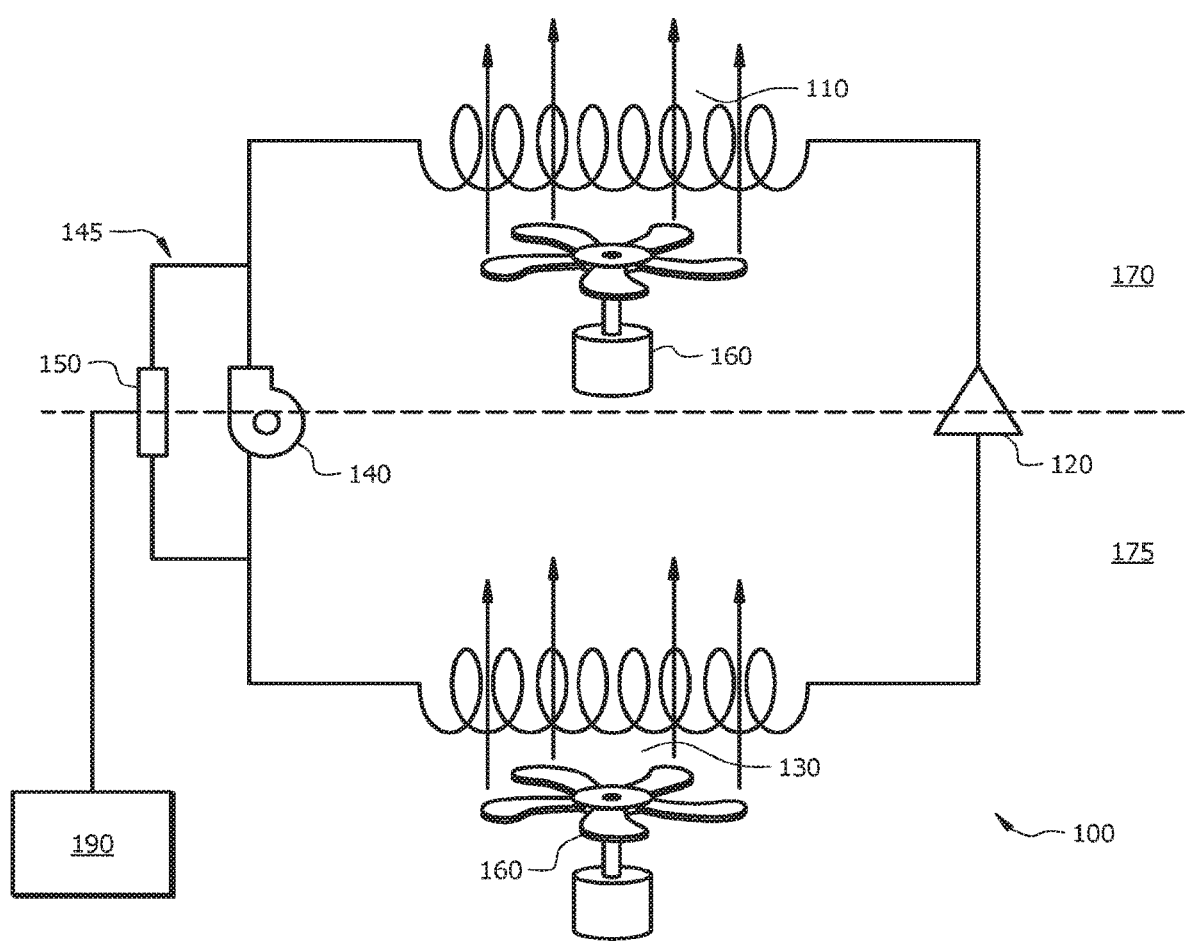
FIG. 1 is a diagram of an HVAC system embodiment under the present disclosure.

Referring now to FIG. 1, a diagram of an HVAC circuit can be seen. System 100 comprises a condenser coil 110, an expansion device 120, an evaporator coil 130, and a compressor 140. In a common use scenario, refrigerant enters condenser 110 as a gas, condenses into a liquid, passes through the expansion device 120, enters the evaporator coil 130 as a liquid and becomes a gas, enters compressor 140, and returns back to the condenser 110. Fans 160 can provide airflow across coils (or heat exchangers) 110, 130. Bypass line 145 can provide a connection from high pressure side 170 to low pressure side 175 of the system. Controller 190 can comprises a connection to bypass valve 150 and to other components of the system.

Bypass line 145 can serve several purposes. In one embodiment, valve 150 is connected to a controller 190. Controller 190 can comprise connections to pressure sensors, flow sensors, temperature sensors, or other sensors and components within system 100. During pressure spikes the controller may open bypass valve 150 to provide pressure equalization. Pressure spikes can occur on system startup, for example, due to residual pressure buildup. When powering down the system the controller 190 may open valve 150 so that upon startup there are no pressure spikes. Other embodiments may comprise a bypass line that connects different parts of the system 100. When the bypass valve 150 is opened, there may be a rush of fluid from one part of the system to another, possibly creating an inconvenient sound.

Figure 2A:
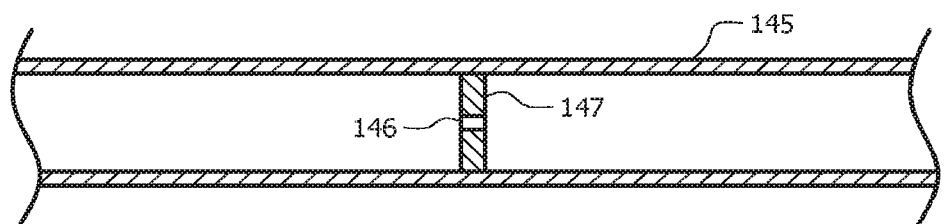
FIGS. 2A-2B are diagrams of a bypass line embodiment under the present disclosure.
Figure 2B:
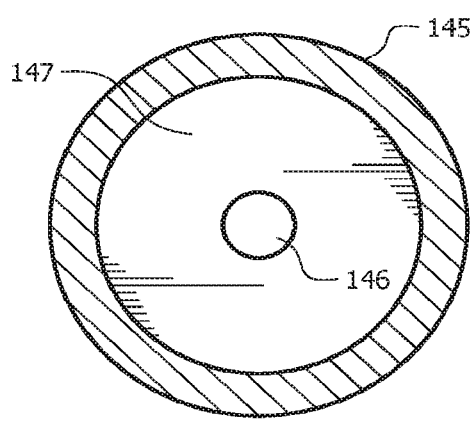

It has been found that adding an inline orifice within the bypass line helps to reduce the noise during pressure equalization. The orifice can resemble that shown in FIGS. 2A and 2B. FIGS. 2A and 2B show an embodiment of bypass line 145 of FIG. 1. Bypass line 145 can comprise inline orifice 146. Orifice 146 can be formed by welding an open-center disc 147 into line 145. Orifice 146 can be of a variety of shapes and sizes. Typically line 145 and disc 147 can comprise copper but can alternatively comprise other materials.

Figure 3:
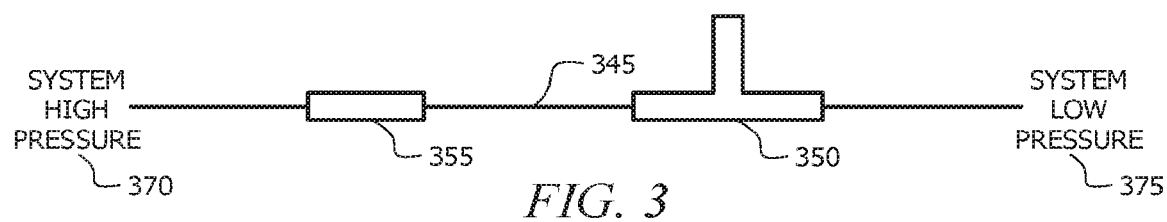
FIG. 3 is a diagram of a bypass line embodiment under the present disclosure.

FIG. 3 shows an embodiment of a bypass line 345. Line 345 extends from a high pressure side 370 to a low pressure side 375 of an HVAC system. Orifice 355 and valve 350 are disposed between sides 370, 375. In a preferred embodiment line 345 is connected to either side of a compressor. But sides 370, 375 can comprise connections at various locations in an HVAC system.

Orifice 355 functions, in part, by slowing down the flow of fluid from a high pressure location to a low pressure location. Instead of a single rush of fluid from one location to another, the fluid hits the first orifice 355 and slows down as fluid passes through the small hole of the orifice. The fluid then goes to valve 350 and is slowed down again. Valves typically comprise a small orifice. When valve 350 is open it serves as a second location for fluid to slow down as it passes through a small orifice within the valve. In previous systems, pressure equalization would occur when fluid rushed directly from high pressure side 370 to low pressure side 375. Under the present disclose, the fluid can flow from high pressure 370 to orifice 355, from orifice 355 to valve 350, and from valve 350 to low pressure location 375. The resulting noise under the present disclosure is lower than that of the prior art.

Valve 370 can comprise a solenoid valve in a preferred embodiment. However, other types of valves may be used.

In a preferred embodiment a bypass line (such as line 145 in FIGS. 1 and 2A-2B, and line 345 in FIG. 3) extends from a high pressure side of a compressor to a low pressure side of a compressor. The preferred embodiment can also comprise a single orifice (such as 355 in FIG. 3) and a single bypass valve (such as 350 in FIG. 3). But various embodiments can comprise various combinations of bypass lines, orifices, and valves. For example, a bypass line may comprise a plurality of orifices or bypass valves. In addition, a given HVAC system may comprise multiple bypass lines. The locations of orifices or bypass valves in a bypass line can also be adjusted in different embodiments. The exact location of an orifice or valve in a bypass line can be adjusted as well as the valve and orifice location in relation to each other. The order of orifice and valve location can be changed. Either the orifice(s) or the valve(s) can be downstream of the other component. The size of the orifice can also be adjusted to any appropriate size or shape.

Figure 4:
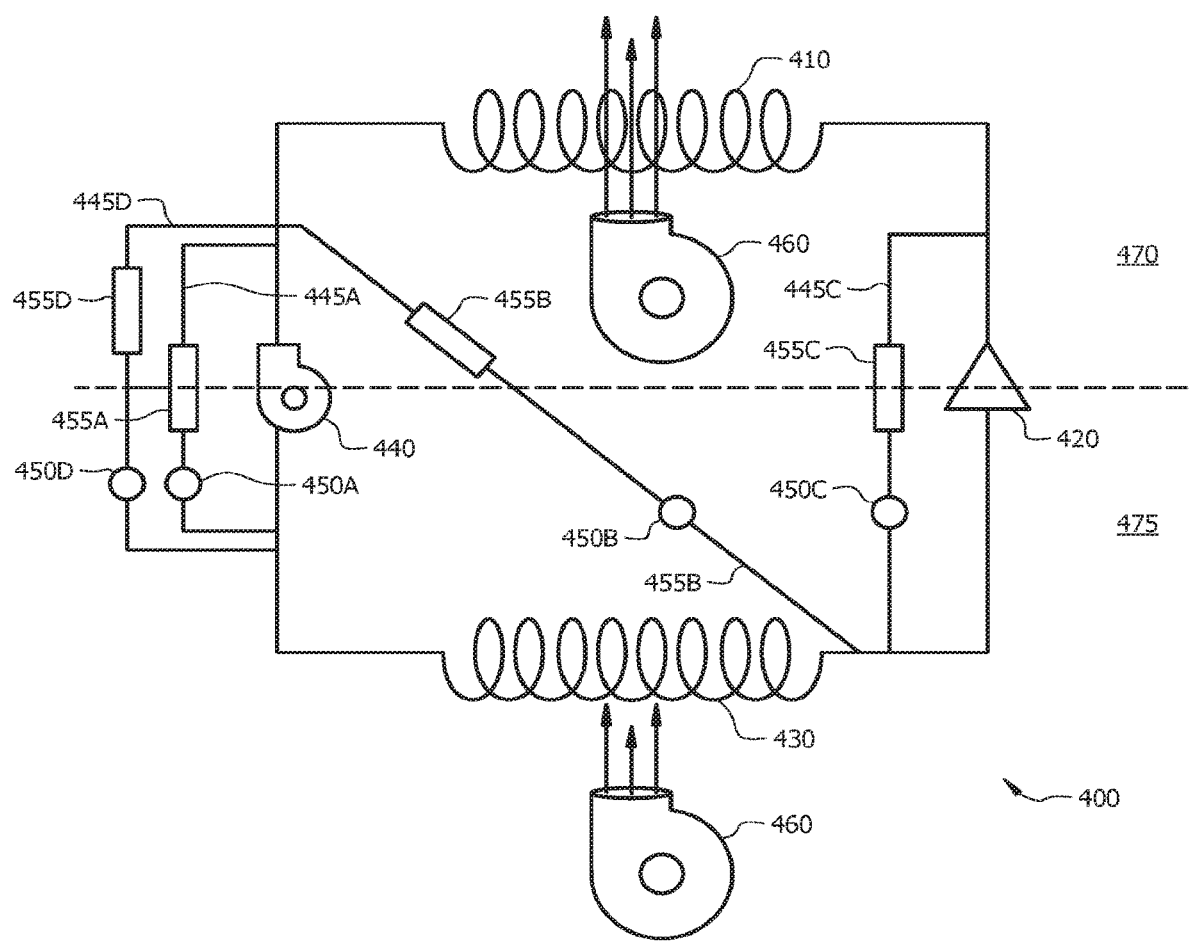
FIG. 4 is a diagram of an HVAC system embodiment under the present disclosure.

FIG. 4 displays possible embodiments of multiple bypass lines 445A-D and different locations for bypass lines 445A-D. HVAC system 400 comprises a condenser coil 410, expansion device 420, evaporator coil 430, compressor 440, and blowers 460. System 400 can comprise multiple bypass lines 445A-D. Each line 445A-D can comprise one or more orifices 455A-D and/or valves 450A-D. System 400 can further comprise bypass lines 445A-D that connect different portions of system 400. Lines 445A, 445D connect the input (low pressure) and output (high pressure) sides of compressor 440. Line 445B connects the output of compressor 440 to the input to the evaporator coil 430. Line 445C connects the input (high pressure) to the output (low pressure) of expansion device 420. Other locations can also be used. Generally, what is desired is that bypass line 445A-D connect the high pressure side 470 to the low pressure side 475.

Other embodiments of HVAC systems under the present disclosure can comprise multiple compressors and condensers. Multiple compressors and condensers can be useful when an HVAC system needs to meet high and low loads. In a common embodiment, an HVAC system can comprise a multistage condenser of three stages. Usually each condenser stage will comprise a connection to a respective compressor. In such embodiments a bypass line can be disposed across each compressor. Alternatively, there can be a single bypass line serving all three condenser stages and compressors. Such embodiments can also comprise bypass lines in different locations, such as in FIG. 4.

HVAC systems comprising a reversing valve can comprise embodiments of the present disclosure. Reversing valves can reverse the flow of refrigerant in an HVAC system, thereby changing the function of the system from heating to cooling, or vice versa. In such systems, a bypass line may need to be disposed across both the compressor and the expansion device. During a first mode of operation (e.g. cooling), a first bypass line may be used. During a second mode of operation (after energizing the reversing valve, changing the operation to heating), a second bypass line may be used. The second bypass line may have been disposed across the expansion device during cooling operation. In heating operating, the expansion device may function as a compressor and the second bypass line can connect the high pressure side to the low pressure side of the HVAC system during heating operations.

Figure 5:
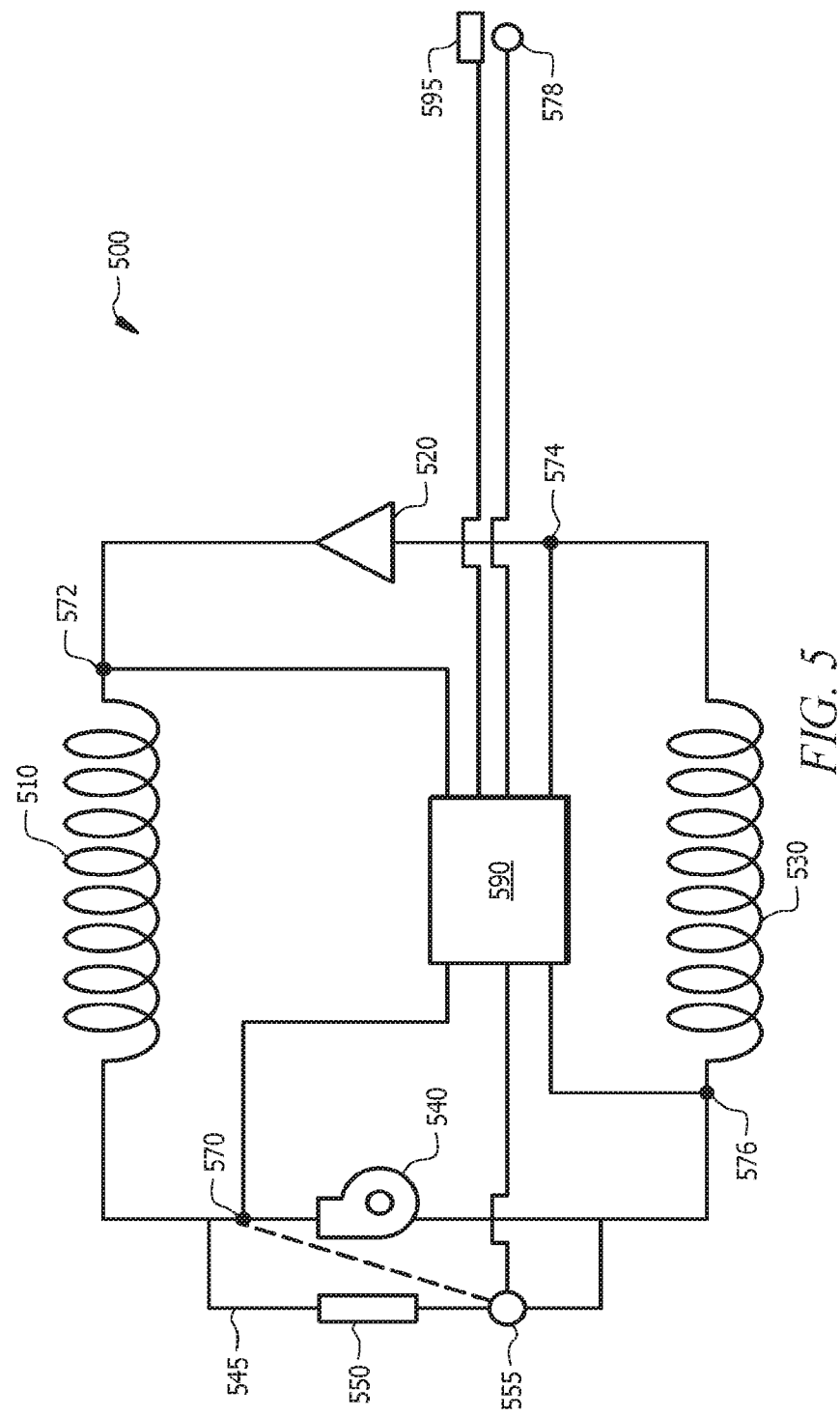
FIG. 5 is a diagram of an HVAC system embodiment under the present disclosure.

Embodiments under the present disclosure can comprise a controller, switches, thermostats, temperature sensors, pressure sensors, and other components. FIG. 5 shows an embodiment under the present disclosure comprising a controller 590 and various sensors. System 500 can comprise condenser 510, expansion device 520, evaporator coil 530, compressor 540, bypass line 545 and controller 590. Controller 590 can control bypass valve 555, such as described in other embodiments herein. Controller 590 can also comprise connections to sensors 570, 572, 574, 576, 578 and thermostat 595. Controller 590 can comprise connections to other components of system 500. Sensors 570, 572, 574, 576, 578 can comprise pressure, temperature, or other types of sensors. Controller 590 can open valve 550 when a sensor reaches a predetermined level. Controller 590 can also open valve 550 upon powering down, or at the occurrence of a predetermined condition. Sensor 578 can be located remote from the controller, such as in an ambient environment, in a conditioned space, or another location. More or fewer sensors than those shown in FIG. 5 can be utilized. Controller 590 can receive input at thermostat 595, such as temperature requests, power on/off, or other commands.

In alternative embodiments of FIG. 5, system 500 can comprise a direct connection between bypass valve 555 and sensor 570 (or another sensor). In such embodiments, sensor 570 can function as a pressure or temperature switch. When pressure, temperature, or another value being measured, reaches a predetermined value, the switch will direct valve 555 to open and therefore relieve the high pressure on the high pressure side of the system.

In a preferred embodiment, a bypass line under the present disclosure can be manufactured with an orifice and valve and implemented into an HVAC circuit. Other embodiments can comprise retrofit embodiments. A bypass line, orifice, and bypass valve can be added to a pre-existing HVAC circuit. Or an orifice can be added to a pre-existing bypass line. Retrofitting a pre-existing bypass line may require cutting the line, inserting the orifice into the line and attaching it by welding or another process, and then sealing the line together.

Figure 6:
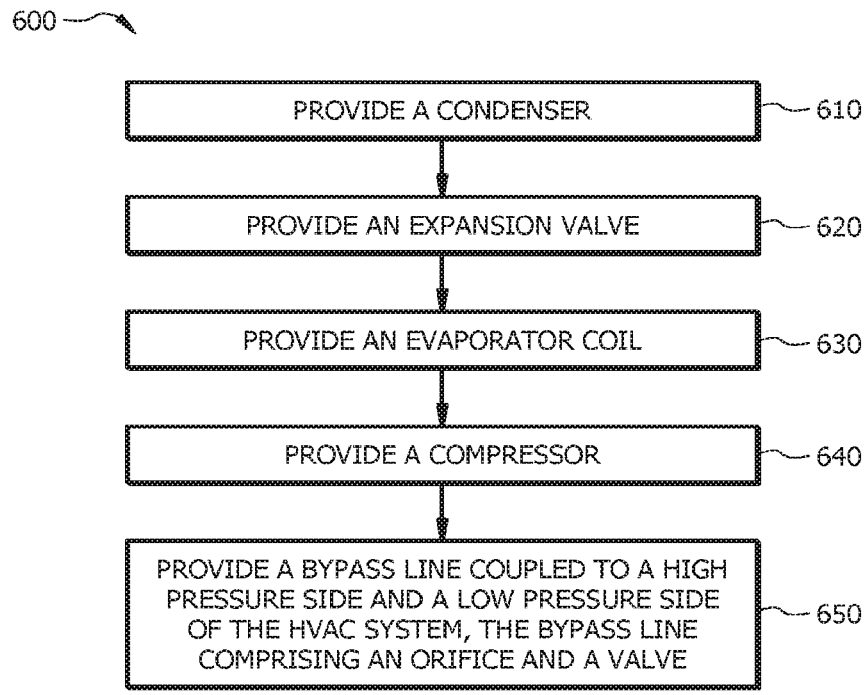
FIG. 6 is a flow-chart diagram of a method embodiment under the present disclosure.

FIG. 6 displays one possible method embodiment 600 under the present disclosure for constructing an HVAC system comprising a high pressure side and a low pressure side. At 610, a condenser is provided that is configured to condense at least a portion of a refrigerant. At 620, an expansion device is provided that is configured to receive the refrigerant from the condenser and lower the refrigerant pressure. At 630, an evaporator coil is provided that is configured to receive the refrigerant from the expansion device and to evaporate at least a portion of the refrigerant. At 640, a compressor is provided that is configured to receive the refrigerant from the evaporator coil, to direct the refrigerant to the condenser, and to increase the refrigerant pressure. At 650, a bypass line is provided for connecting the high and low pressure sides, the bypass line comprising an orifice and a valve, and wherein the bypass line is operable to equalize pressure within the HVAC system when the valve is open.

Figure 7:
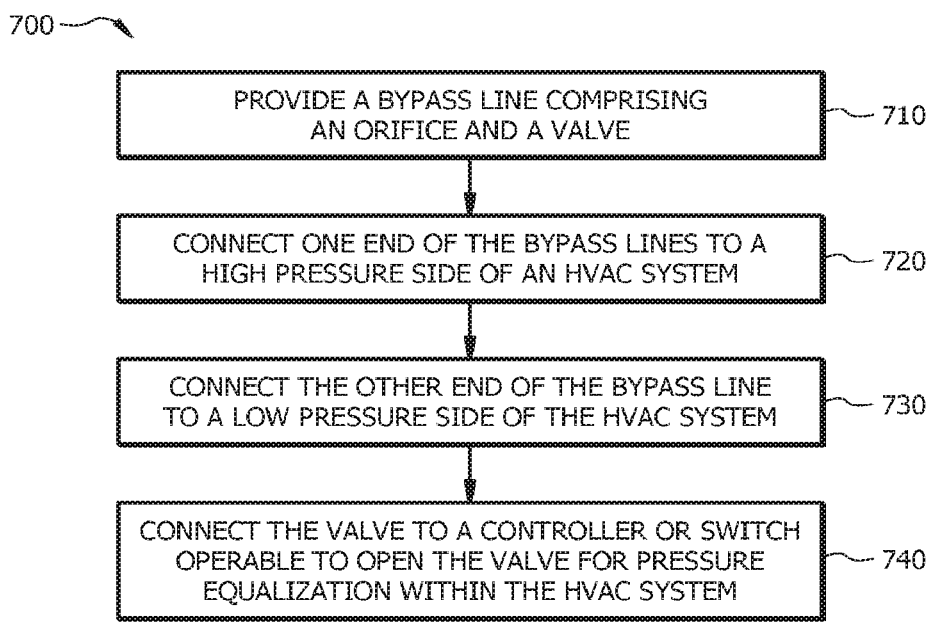
FIG. 7 is a flow-chart diagram of a method embodiment under the present disclosure.

Another possible method embodiment is shown in FIG. 7. Method 700 can be used to retrofit a bypass line under the present disclosure to a pre-existing HVAC system. At 710, a bypass line is provided that comprises an orifice and a valve. At 720, one end of the bypass line is connected to a high pressure side of an HVAC system. At 730, the other end of the bypass line is connected to a low pressure side of the HVAC system. At 740, the valve is connected to a controller or switch operable to open the valve for pressure equalization within the HVAC system.

Figure 8:
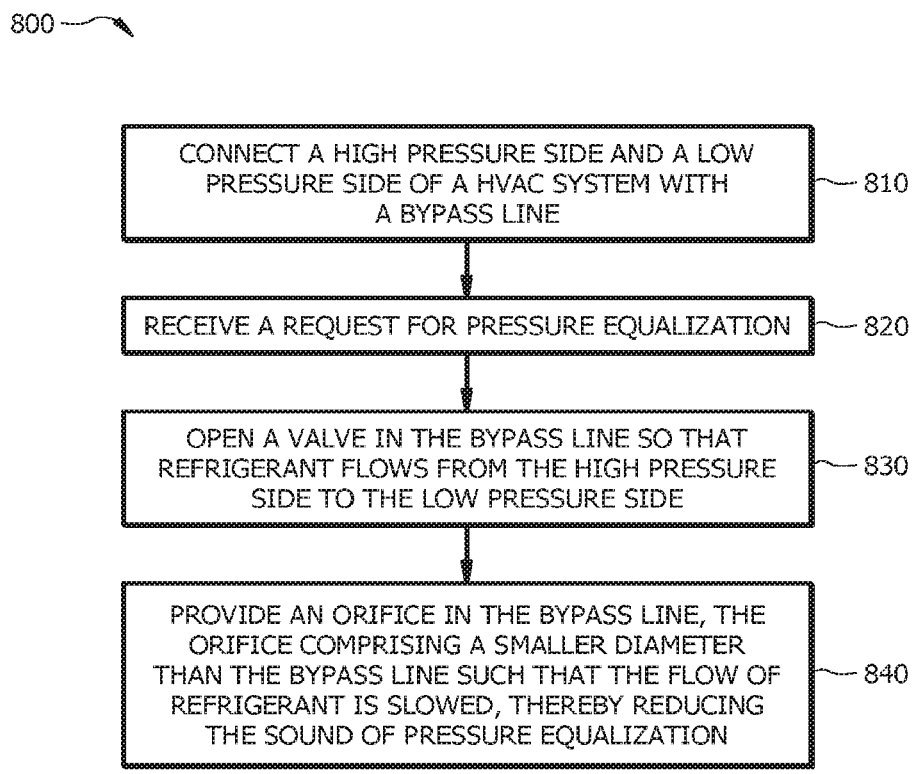
FIG. 8 is a flow-chart diagram of a method embodiment under the present disclosure.

Another possible method embodiment 800 under the present disclosure can be seen in FIG. 8. Method 800 comprises a method for equalizing pressure within an HVAC system. At 810, a high pressure side of the HVAC system and a lower pressure side of the HVAC system are connected by a bypass line. At 820 a request for pressure equalization in the HVAC system is received. At 830 a valve is opened within the bypass line so that refrigerant flows from the high pressure side to the low pressure side. At 840 an orifice is provided within the bypass line, the orifice comprising a smaller diameter than the bypass line such that the flow of refrigerant is slowed thereby reducing the sound of pressure equalization.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A bypass line within a heating, ventilation, and air conditioning (HVAC) system comprising:
   a fluid line connected to a high pressure side of a compressor and a low pressure side of the compressor of the HVAC system;
   a valve within the fluid line disposed between the high pressure side and the low pressure side;
   an orifice disposed within the fluid line and arranged upstream from the valve in a refrigerant flow direction, wherein the orifice comprises a diameter that is smaller than a diameter of the fluid line, wherein a first end of the orifice is directly connected to the high pressure side of the compressor and a second end of the orifice is directly connected to the valve;
   wherein, when the valve is open, refrigerant flows through the fluid line from the high pressure side to the low pressure side via the orifice and the valve, wherein the refrigerant contacts the orifice prior to contacting the valve;
   wherein flow of refrigerant from a high pressure side of the orifice is initially slowed upon contact with the orifice; and
   wherein the flow of refrigerant from a high pressure side of the valve is subsequently slowed upon contact with the valve.

2. The bypass line of claim 1, wherein, when the valve is closed, the refrigerant ceases to flow through the fluid line from the high pressure side to the low pressure side.

3. The bypass line of claim 1, wherein the valve is arranged downstream from the high pressure side in the refrigerant flow direction.

4. The bypass line of claim 1, wherein the orifice and the valve are each configured to slow the flow of refrigerant.

5. The bypass line of claim 1, wherein the valve is coupled to a controller configured to open and close the valve.

6. The bypass line of claim 5, wherein one or more sensors are coupled to the controller.

7. The bypass line of claim 5 wherein the controller is operable to open the valve when the HVAC system powers down.

8. The bypass line of claim 5 wherein the controller comprises a connection to one or more sensors.

9. The bypass line of claim 8, wherein the controller is operable to open and close the valve based at least in part on a measurement from the one or more sensors.

10. The bypass line of claim 1, wherein the valve is coupled to a pressure switch, wherein when a pressure reaches a predetermined value the pressure switch opens the valve.

11. The bypass line of claim 1, wherein the valve is coupled to a temperature switch, wherein when a temperature reaches a predetermined value the temperature switch opens the valve.

12. A method of equalizing pressure within a heating, ventilation, and air conditioning (HVAC) system comprising:
- connecting a high pressure side of a compressor to a lower pressure side of the compressor of the HVAC system using a bypass line;
- receiving a request for pressure equalization in the HVAC system;
- opening a valve within the bypass line so that refrigerant flows from the high pressure side to the low pressure side;
- providing, within the bypass line, an orifice comprising a diameter that is smaller than a diameter of the bypass line, wherein the refrigerant contacts the orifice prior to contacting the valve, wherein a first end of the orifice is directly connected to the high pressure side of the compressor and a second end of the orifice is directly connected to the valve;
- wherein flow of refrigerant from a high pressure side of the orifice is initially slowed upon contact with the orifice; and
- wherein the flow of refrigerant from a high pressure side of the valve is subsequently slowed upon contact with the valve.

13. The method of claim 12, wherein the orifice is arranged upstream from the valve in a refrigerant flow direction.

14. The method of claim 13, wherein the valve is arranged downstream from the high pressure side in the refrigerant flow direction.

15. The method of claim 12 further comprising providing a second orifice within the bypass line.

16. The method of claim 12 further comprising providing a controller coupled to the valve and operable to open and close the valve.

17. The method of claim 16 further comprising providing one or more sensors coupled to the controller, wherein the controller opens and closes the valve base at least in part on a measurement from the one or more sensors.

18. A heating, ventilation, and air conditioning (HVAC) system for circulating refrigerant, comprising:
- a condenser configured to condense at least a portion of the refrigerant;
- an expansion device configured to receive the refrigerant from the condenser;
- an evaporator coil configured to receive the refrigerant from the expansion device;
- a compressor configured to receive the refrigerant from the evaporator coil; and
- a bypass line connecting a high and low pressure sides of the HVAC system, the bypass line comprising;
  - a fluid line connected to a high pressure side of the compressor and a low pressure side of the compressor of the HVAC system;
  - a valve within the fluid line disposed between the high pressure side and the low pressure side;
  - an orifice disposed within the fluid line and arranged upstream from the valve in a refrigerant flow direction, wherein the orifice comprises a diameter that is smaller than a diameter of the fluid line, wherein a first end of the orifice is directly connected to the high pressure side of the compressor and a second end of the orifice is directly connected to the valve;
  - wherein, when the valve is open, refrigerant flows through the fluid line from the high pressure side to the low pressure side via the orifice and the valve, wherein the refrigerant contacts the orifice prior to contacting the valve;
  - wherein flow of refrigerant from a high pressure side of the orifice is initially slowed upon contact with the orifice; and
  - wherein the flow of refrigerant from a high pressure side of the valve is subsequently slowed upon contact with the valve.

19. The HVAC system of claim 18, wherein, when the valve is closed, the refrigerant ceases to flow through the fluid line from the high pressure side to the low pressure side.

20. The HVAC system of claim 18, wherein the valve is arranged downstream from the high pressure side in the refrigerant flow direction.

* * * * *